(12) United States Patent
Ooka et al.

(10) Patent No.: US 10,144,384 B2
(45) Date of Patent: Dec. 4, 2018

(54) COVER FOR AIRBAG DEVICE

(71) Applicant: NIHON PLAST CO., LTD., Fujinomiya-shi, Shizuoka (JP)

(72) Inventors: Masahiro Ooka, Fujinomiya (JP); Akihiko Yamami, Fujinomiya (JP); Akito Urushibata, Fujinomiya (JP); Yohei Kiuchi, Fujinomiya (JP)

(73) Assignee: NIHON PLAST CO., LTD., Fujinomiya-Shi, Shizuoka (JP)

( * ) Notice: Subject to any disclaimer, the term of this patent is extended or adjusted under 35 U.S.C. 154(b) by 0 days.

(21) Appl. No.: 15/473,309

(22) Filed: Mar. 29, 2017

(65) Prior Publication Data

US 2017/0282837 A1    Oct. 5, 2017

(30) Foreign Application Priority Data

Mar. 29, 2016  (JP) .................................. 2016-065562

(51) Int. Cl.
*B60R 21/2165* (2011.01)
*B60R 21/203* (2006.01)
*B60R 21/215* (2011.01)

(52) U.S. Cl.
CPC ...... *B60R 21/21656* (2013.01); *B60R 21/203* (2013.01); *B60R 21/215* (2013.01); *B60R 2021/21652* (2013.01)

(58) Field of Classification Search
CPC ................ B60R 21/203; B60R 21/215; B60R 21/21652; B60R 21/21656; B60R 2021/21652
See application file for complete search history.

(56) References Cited

U.S. PATENT DOCUMENTS

| 4,148,503 A | * | 4/1979 | Shiratori | ........... B60R 21/21656 280/728.3 |
| 4,991,869 A | * | 2/1991 | Hopf | ................. B60R 21/21656 280/728.3 |
| 5,013,064 A | * | 5/1991 | Miller | ............... B60R 21/21656 280/730.1 |
| 5,069,477 A | * | 12/1991 | Shiraki | ............. B60R 21/21656 280/728.3 |
| 5,084,122 A | * | 1/1992 | Fukushima | ......... B29C 33/0033 156/242 |
| 5,085,462 A | * | 2/1992 | Gualtier | ............ B60R 21/21658 200/61.54 |

(Continued)

FOREIGN PATENT DOCUMENTS

| JP | 09-183373 A | 7/1997 |
| JP | 2009-120038 A | 6/2009 |

*Primary Examiner* — Paul N Dickson
*Assistant Examiner* — Timothy Wilhelm
(74) *Attorney, Agent, or Firm* — Procopio, Cory, Hargreaves & Savitch LLP

(57) ABSTRACT

A cover for an airbag device includes: a cover body including an opposed part covering an airbag housed underneath, and a tear line provided on the cover body and splitting when the airbag is inflated; and a covering material covering the opposed part of the cover body. The covering material includes: a fragile portion provided on a back surface of the covering material and at least partly overlapping with the tear line; and a stitched portion, at least part of the stitched portion being located at a position overlapping with the tear line and connected to the fragile portion.

3 Claims, 3 Drawing Sheets

(56) References Cited

U.S. PATENT DOCUMENTS

| | | | | |
|---|---|---|---|---|
| 5,195,773 | A * | 3/1993 | Sawada | B60R 21/21656 280/728.3 |
| 5,265,904 | A * | 11/1993 | Shelton | B60R 21/21658 200/61.54 |
| 5,335,935 | A * | 8/1994 | Proos | B29C 37/0057 280/728.3 |
| 5,338,060 | A * | 8/1994 | Soderquist | B60R 21/21656 280/728.2 |
| 5,342,086 | A * | 8/1994 | Harris | B60R 21/21656 280/728.3 |
| 5,449,197 | A * | 9/1995 | Kerner | B60R 21/21658 280/728.3 |
| 5,498,026 | A * | 3/1996 | Eckhout | B60N 2/58 280/728.3 |
| 5,499,841 | A * | 3/1996 | Trojan | B60Q 5/003 200/61.54 |
| 5,636,859 | A * | 6/1997 | Williams | B60R 21/203 280/728.2 |
| 5,855,391 | A * | 1/1999 | Holland | B60R 21/2165 280/728.3 |
| 5,893,581 | A * | 4/1999 | Niederman | B60R 21/21656 280/728.3 |
| 5,957,483 | A * | 9/1999 | Miltenberger | B60R 21/2165 280/728.3 |
| 5,975,562 | A * | 11/1999 | Yamamoto | B60R 21/203 280/728.3 |
| 6,106,003 | A * | 8/2000 | Rahmstorf | B60R 21/2165 280/728.3 |
| RE36,898 | E * | 10/2000 | Sawada | B32B 27/08 428/43 |
| 6,247,724 | B1 * | 6/2001 | Jambor | B60R 21/21656 280/728.2 |
| 6,402,189 | B1 * | 6/2002 | Gray | B29C 44/351 280/728.3 |
| 6,422,602 | B1 * | 7/2002 | Ishii | B60Q 5/003 280/728.2 |
| 6,443,484 | B2 * | 9/2002 | Anglsperger | B60R 21/216 280/728.3 |
| 6,502,852 | B2 * | 1/2003 | Kassman | B60R 21/2155 280/728.3 |
| 6,626,458 | B2 * | 9/2003 | Fujita | B60Q 1/0082 280/728.3 |
| 6,672,614 | B2 * | 1/2004 | Endo | B60R 21/21656 280/728.3 |
| 6,793,238 | B2 * | 9/2004 | Schneider | B60R 21/2165 280/728.2 |
| 6,837,514 | B1 * | 1/2005 | Fujita | B60Q 1/0082 200/61.54 |
| 7,007,970 | B2 * | 3/2006 | Yasuda | B29C 65/06 280/728.3 |
| 7,025,374 | B2 * | 4/2006 | Evans | B60R 21/2165 280/728.3 |
| 7,029,025 | B2 * | 4/2006 | Schwark | B60R 21/2165 280/728.3 |
| 7,097,199 | B2 * | 8/2006 | Dearden | B60R 21/21656 280/728.3 |
| 7,232,001 | B2 * | 6/2007 | Hakki | B60R 19/205 180/271 |
| 7,354,060 | B2 * | 4/2008 | Thomas | B60R 21/21656 280/728.3 |
| 7,390,013 | B2 * | 6/2008 | Chavez | B60R 21/21656 280/728.3 |
| 7,425,018 | B2 * | 9/2008 | Suwama | B29C 45/1671 280/728.3 |
| 7,637,528 | B2 * | 12/2009 | Shimazaki | B60Q 5/003 280/728.2 |
| 7,703,799 | B2 * | 4/2010 | Takagi | B60R 21/21656 280/728.3 |
| 7,766,381 | B2 * | 8/2010 | Fujimori | B60R 21/21656 280/731 |
| 7,851,039 | B2 * | 12/2010 | Boinais | B29C 44/351 428/102 |
| 7,918,481 | B2 * | 4/2011 | Ohgo | B60R 21/2165 280/728.3 |
| 7,988,189 | B2 * | 8/2011 | Hayashi | B60R 21/21656 280/731 |
| 8,256,797 | B2 * | 9/2012 | Sakurai | B60R 21/2037 200/61.55 |
| 8,714,626 | B2 * | 5/2014 | Kornylo | B60N 2/5883 112/475.18 |
| 9,067,560 | B2 * | 6/2015 | Walter | B60R 21/2165 |
| 9,296,354 | B1 * | 3/2016 | Preisler | B60R 21/215 |
| 9,321,420 | B2 * | 4/2016 | Kwon | B60R 21/21656 |
| 2004/0164531 | A1 * | 8/2004 | Riha | B29C 59/16 280/732 |
| 2004/0174002 | A1 * | 9/2004 | Sauer | B60R 21/2165 280/728.3 |
| 2011/0101653 | A1 * | 5/2011 | Rick | B60R 21/21656 280/728.3 |

\* cited by examiner

COVER FOR AIRBAG DEVICE

CROSS-REFERENCE TO RELATED APPLICATION

This application claims the benefit of priority of Japanese Patent Application No. 2016-065562, filed on Mar. 29, 2016, the entire contents of which are hereby incorporated by reference.

BACKGROUND OF THE INVENTION

1. Field of the Invention

The present invention relates to a cover for an airbag device including a tear line splitting when an airbag is inflated.

2. Description of the Related Art

Airbag devices are known that are installed in predetermined positions such as instrument panels and steering wheels of vehicles. An airbag device includes a box-shaped case housing a folded airbag and an inflator for generating gas to inflate the airbag, and a cover covering an opening at the top of the case. The cover includes a lid as an opposed part opposed to the airbag and provided with a tear line (a split-expected line) to split, and an open-expected flap defined by the tear line on the cover. In the event of collision or impact of a vehicle, the airbag inflated by gas generated by the inflator pushes forward the open-expected flap covering the airbag, and the tear line splits by the inflated pressure, so that a door-flap (the flap) at the lid opens.

In order to meet a recent demand for improvement of appearance of such airbag devices, covers including lids covered with covering materials such as leather are known. In such a cover covered with a covering material, the covering material is provided on the backside thereof with a recess reduced in thickness and located at a position corresponding to a tear line, so as to facilitate deployment of an airbag without the cover blocked by the covering material (refer to JP H09-183373 at page 3, and FIG. 1 to FIG. 5).

With regard to the tear line, there may be a case where an intersecting portion that intersects substantially at right angles near the outer periphery of the cover is provided corresponding to the opening characteristic required for the cover body. In such a case, there is known a cover body provided with decorative stitching (stitching lines) for reinforcing the edge portion of the intersecting portion in the covering material so that the tear line does not go beyond the intersecting portion. In this cover body, breakage going beyond the tear line is prevented by decorative stitching, and the breaking can be smoothly progressed along the desired tear line (refer to JP 2009-120038 at page 3 and FIG. 5 to FIG. 7).

When a recess reduced in thickness and decorative stitches for improving an appearance as described above are combined to obtain a cover, a covering material may cause rupture because of a pressure applied to the covering material during stitching when the recess and perforations of the decorative stitches are aligned close to each other. Further, since the covering material may split at both the recess overlapping with the tear line and the perforations of the decorative stitches when the airbag is inflated, the covering material of the cover may tear in an irregular shape, not as originally designed.

Accordingly, there is a need for improvement in covers for airbag devices in order to not only improve yields (productivity) but also improve performance of splitting in a predetermined shape when inflating airbags.

SUMMARY OF THE INVENTION

The present invention has been made in view of the conventional problems. An object of the present invention is to provide a cover for an airbag device with improved appearance and productivity and further accurate splitting performance as designed when inflating an airbag.

A cover for an airbag device according to a first aspect of the present invention includes: a cover body including an opposed part covering an airbag housed underneath, and a tear line provided on the cover body and splitting when the airbag is inflated; and a covering material covering the opposed part of the cover body. The covering material includes: a fragile portion provided on a back surface of the covering material and at least partly overlapping with the tear line; and a stitched portion, at least part of the stitched portion being located at a position overlapping with the tear line and connected to the fragile portion.

A cover for an airbag device according to a second aspect of the present invention is the cover of the first aspect, wherein: the fragile portion includes a plurality of fragile portions independently provided on the back surface of the covering material; and the at least part of the stitched portion connects the fragile portions at the position overlapping with the tear line.

A cover for an airbag device according to a third aspect of the present invention is the cover of the second aspect, wherein: the tear line includes side tear lines extending on both sides of the opposed part, a lateral connection tear line connecting the side tear lines, extension tear lines located separately from ends of the side tear lines, and vertical connection tear lines connecting the side tear lines and the extension tear lines; the fragile portion includes side fragile portions corresponding to the side tear lines, a lateral connection fragile portion corresponding to the lateral connection tear line, and extension fragile portions corresponding to the extension tear lines; and the at least part of the stitched portion overlaps with part of the tear line between the side tear lines and the extension tear lines so as to connect the side fragile portions and the extension fragile portions, and is located at a predetermined distance or less from the vertical connection tear lines as viewed in a deployment direction of the airbag.

A cover for an airbag device according to a fourth aspect of the present invention is the cover of the first aspect, wherein the at least part of the stitched portion is located at a distance of 5 mm or less from the position overlapping with the tear line as viewed in a deployment direction of the airbag.

The cover for an airbag device according to the first aspect of the present invention improves an appearance with the stitched portion and at the same time prevents the covering material from tearing at the fragile portion during stitching of the stitched portion, so as to increase productivity. The cover body and the covering material can split in a predetermined shape along the tear line and the fragile portion when the airbag is inflated, while being prevented from splitting excessively, due to the stitched portion serving as a stop end of the fragile portion.

The cover for an airbag device according to the second aspect of the present invention can obtain the effect of the first aspect. Further, the covering material can split in a predetermined shape as designed from one of the fragile portions to the other of the fragile portions through at least part of the stitched portion at the time of deployment of the airbag.

The cover for an airbag device according to the third aspect of the present invention can obtain the effect of the second aspect. Further, the covering material splits sequentially along the lateral connection fragile portion, the side fragile portion, at least part of the stitched portion, and the extension fragile portion, in association with the splits of the cover body along the lateral connection tear line, the side tear line, the vertical connection tear line, and the extension tear line at the time of deployment of the airbag, so that the cover splits in a predetermined shape accurately.

The cover for an airbag device according to the fourth aspect of the present invention can obtain the effect of the first aspect. Further, the covering material can split from one of the fragile portions to the other of the fragile portions through at least part of the stitched portion more accurately in association with the split of the tear line of the cover body.

DESCRIPTION OF EMBODIMENTS

Hereinafter, an embodiment of the present invention will be described with reference to FIG. 1 to FIG. 5.

Figure 5:
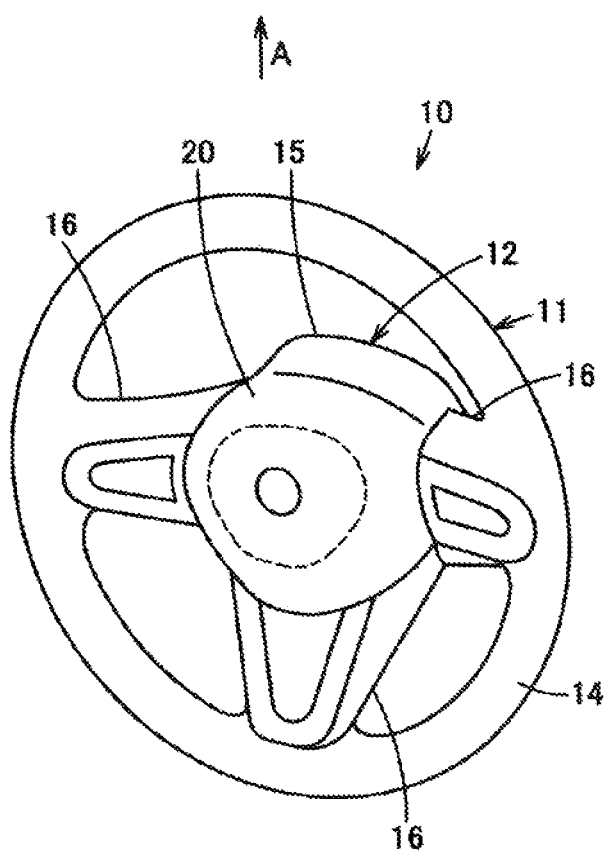
FIG. 5 is a perspective view of a steering wheel equipped with an airbag device including the cover shown in FIG. 1.

FIG. 5 illustrates a steering wheel 10 of a motor vehicle. The steering wheel 10 includes a steering wheel body 11, and an airbag device 12 installed in the steering wheel body 11 toward the driver's seat. Although the steering wheel 10 is fixed to a steering shaft commonly installed in the vehicle in an inclined state, the present embodiment defines, for illustration purposes, the steering shaft side as a back side, the driver's side as a front side, and a direction toward a windshield (indicated by arrow A) as an upper side, on the basis of forward movement of the vehicle.

The steering wheel body 11 mainly includes a rim 14 serving as a grip formed into a circular shape, a boss portion 15 located inside the rim 14, and a plurality of (three in this embodiment) spokes 16 connecting the rim 14 and the boss portion 15. In the present embodiment, the spokes 16 are located on the upper right and left sides and on the bottom side of the boss portion 15 in the state of straight forward movement of the vehicle.

Although not shown, the boss portion 15 includes a substantially cylindrical boss on the back side fitted to the steering shaft, and a boss plate serving as a core member integrated with the boss by die casting with a magnesium alloy. Cores of the spokes 16 extend integrally from the boss plate, or fixed to the boss plate by welding, for example. A core of the rim 14 is fixed to the cores of the spokes 16 by welding. The circumferences of the core of the rim 14 and part of the cores of the spokes 16 toward the rim 14 are provided with a covering member, and the entire or part of the covering member is covered with a covering material such as leather or artificial leather.

The airbag device 12 is also referred to as an airbag module, and is located on the front side of the steering wheel body 11 so as to cover the boss portion 15. The airbag device 12 includes a base plate made of metal serving as an attachment member, a sack-like airbag, an inflator for generating gas, and a cover 20 shown in FIG. 1. The base plate is attached to the steering wheel body 11 via a horn pad or a bracket. The airbag, the inflator, and the cover 20 are attached to the base plate. The airbag folded into a small packet is covered with the cover 20.

The cover 20 is also referred to as a case, a pad, or a module cover. The cover 20 includes a cover body 21 (FIG. 2) integrally formed of synthetic polymer such as thermoplastic olefin (TPO), and a covering material 22 (FIG. 3A and FIG. 3B) covering the cover body 21.

Figure 1:
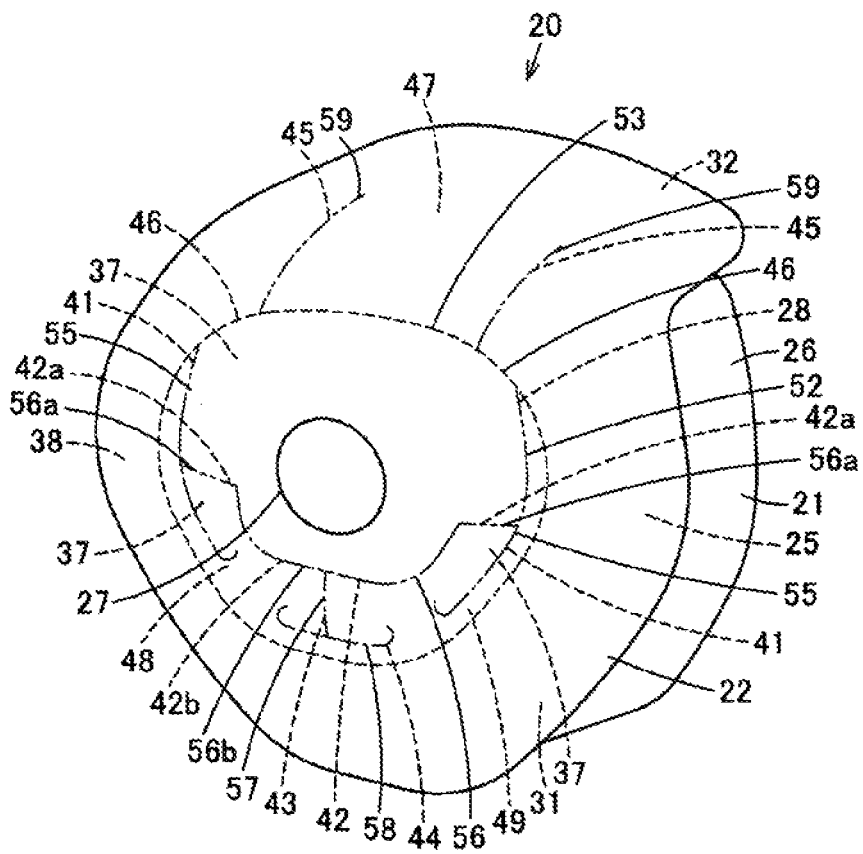
FIG. 1 is a perspective view of a cover for an airbag device according to an embodiment of the present invention.

The cover body 21 shown in FIG. 1 includes a surface plate 25 as an opposed part partly covering the boss portion 15 and the spokes 16 (FIG. 5), and a peripheral plate 26 as a peripheral wall extending from the back surface (rear surface) of the surface plate 25. The peripheral plate 26 is formed into a prism having a substantially polygonal shape as viewed from the front. The surface plate 25 and the peripheral plate 26 of the cover 20 define an airbag housing for housing the folded airbag. An emblem 27 as a decorative member is placed on the front side of the airbag housing. The emblem 27 is not an essential element. The surface plate 25 is provided with a tear line 28 extending across the airbag housing toward the upper side.

The surface plate 25 may be variously designed. According to the present embodiment, the surface plate 25 includes a front plate 31 as a main body of the opposed part approximately conforming to the boss portion 15 (FIG. 5) and having a slightly larger size than the peripheral plate 26 as viewed from the front, and an extension plate 32 as an extension continuously extending from the upper end of the front plate 31 toward the back side (the opposite side of the driver's seat). The front plate 31 and the extension plate 32 are integrated together. The front plate 31 is provided with a hole 35 (FIG. 2) for attaching the emblem 27 thereto.

Figure 2:
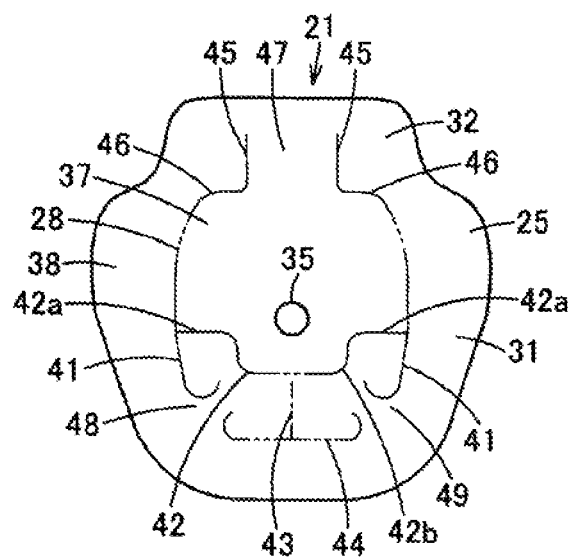
FIG. 2 is a front view of a cover body of the cover shown in FIG. 1.

The tear line 28 shown in FIG. 2 has a reduced thickness, and may also be referred to as a tear, a tear slit, a split-expected portion, a deploying-expected slit, an open-expected flap line, or a rupture portion. The tear line 28 is formed into a recess on the back surface (the rear surface) of the front plate 31 and the extension plate 32 of the surface plate 25 to serve as a fragile portion (a weak portion), which is more fragile than the other regions in the surface plate 25, and is tearable and easily deformable. The surface plate 25 includes a plurality of (three in the present embodiment) open-expected flaps 37 defined by the tear line 28, and an outer block 38 located outside the tear line 28 and surrounding the open-expected flaps 37 to serve as an undeployed member. The tear line 28 may be designed as appropriate depending on the desired shape and number of the open-expected flaps 37. In the present embodiment, the tear line 28 includes: side tear lines 41, 41 (a first edge tear lines) located along both side edges of the front plate 31; a lateral connection tear line 42 (a first connection tear line) connecting the side tear lines 41 across the middle of the front plate 31 and extending below the emblem 27; a lower connection tear line 43 (a second connection tear line) vertically extending below the emblem 27 (FIG. 1) substantially from the middle of the lateral connection tear line 42 in the right-left direction; a bottom tear line 44 (a second edge tear line) extending from the lower end of the lower connection tear line 43 toward both sides in the right-left direction along the bottom edge of the front plate 31; extension tear lines 45, 45 separated upward from the side tear lines 41 and extending in parallel along the extension plate 32 toward the back side in the vertical direction (the front-rear direction); and vertical connection tear lines 46 (third connection tear lines) connecting the side tear lines 41 and the extension tear lines 45 along both upper side edges of the front plate 31. The lateral connection tear line 42 and the lower connection tear line 43 are located closer to the center of the surface plate 25 (the front plate 31) than the side tear lines 41, the bottom tear line 44, and the vertical connection tear lines 46, and opposed to the airbag housed underneath. The extension tear lines 45 continuously extend from the front plate 31 toward the extension plate 32.

The side tear lines 41 may also be referred to as main tear lines, and are formed into a substantially arc-like shape protruding outward on both sides of the front plate 31 of the surface plate 25. The side tear lines 41 are elongated along both side edges of the surface plate 25 (the front plate 31). The lower ends of the side tear lines 41 are bent up so as to prevent expansion of splits, for example.

The lateral connection tear line 42 may also be referred to as a division tear line for dividing the area surrounded by the tear line 28 defining the open-expected flaps 37 into upper and lower sections. The lateral connection tear line 42 includes straight portions 42a, 42a extending straight toward the center from the both side tear lines 41, and a bypass portion 42b connecting the straight portions 42a and curved downward so as to bypass the emblem 27 (FIG. 1). The straight portions 42a extend in the right-left direction vertical to the side tear lines 41 and reach the middle of the respective side tear lines 41 in the vertical direction. Thus, the tear line 28 includes corners (substantially at right angles) at intersecting portions of the side tear lines 41 and the lateral connection tear line 42.

The lower connection tear line 43 may also be referred to as a division tear line for dividing the lower section of the open-expected flaps 37 further into right and left sections. The lower connection tear line 43 vertically extends downward from the bypass portion 42b of the lateral connection tear line 42. The lower connection tear line 43 extends further below the lower ends of the side tear lines 41 toward the lower edge of the front plate 31 of the surface plate 25, and reaches the bottom tear line 44. The lower connection tear line 43 connects the lateral connection tear line 42 and the bottom tear line 44. The lower connection tear line 43 therefore connects the respective side tear lines 41 and the bottom tear line 44 via the lateral connection tear line 42. The tear line 28 includes corners (substantially at right angles) at an intersecting portion of the lower connection tear line 43 and the bottom tear line 44.

The bottom tear line 44 defines the bottom of the open-expected flaps 37, and is formed into a substantially arc-like shape protruding downward in the front plate 31 of the surface plate 25. The bottom tear line 44 is elongated along the lower edge of the surface plate 25 (the front plate 31). The both ends of the bottom tear line 44 are bent up so as to prevent expansion of splits, for example.

The extension tear lines 45 vertically extend from the upper edge of the front plate 31 toward the extension plate 32. The upper ends of the extension tear lines 45 are located substantially in the middle of the extension late portion 32 in the front-rear direction. The vertical connection tear lines 46 extend from both side edges of the front plate 31 obliquely toward the upper edge of the front plate 31. The vertical connection tear lines 46 extend upward from the side tear lines 41 to the extension tear lines 45, while being gradually inclined toward the center of the front plate 31 in the lateral direction (the right-left direction).

The respective open-expected flaps 37 normally cover the deployment side of the airbag folded and housed underneath, and open up when the tear line 28 splits upon inflation of the airbag. The respective open-expected flaps 37 may have any shape that can open to deploy the airbag in an appropriate manner. The open-expected flaps 37 in the present embodiment are defined by the tear line 28, including one flap located at the upper portion of the surface plate 25, and the other two flaps located on both sides at the lower portion of the surface plate 25.

The section between the upper ends of the side tear lines 41 (the extension tear lines 45), and the sections between the respective lower ends of the side tear lines 41 and the respective ends of the bottom tear line 44 serve as hinges 47, 48, and 49 on which the flaps pivot to open toward the front. In other words, the sections not provided with the tear line 28 on the surface plate 25 connect the open flaps to the peripheral plate 26 (FIG. 1) and the outer block 38 serving as an undeployed member.

Figure 3A:
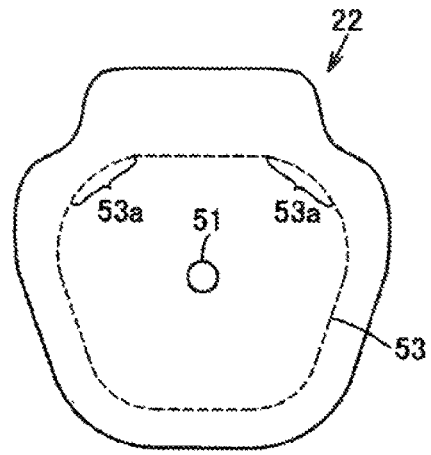
FIG. 3A is a front view of a covering material of the cover shown in FIG. 1.
Figure 3B:
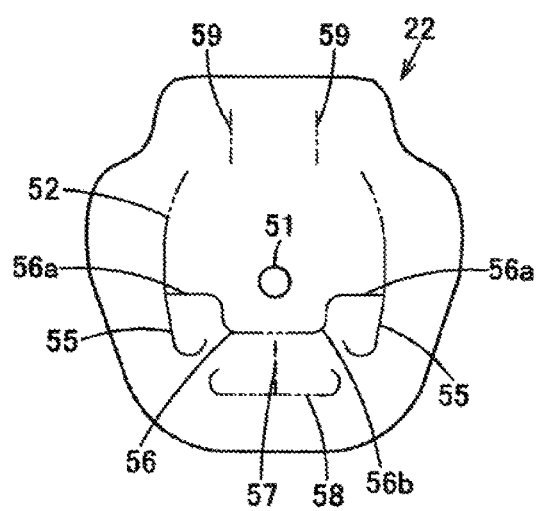
FIG. 3B is a rear view of the covering material of the cover shown in FIG. 1.
Figure 4:
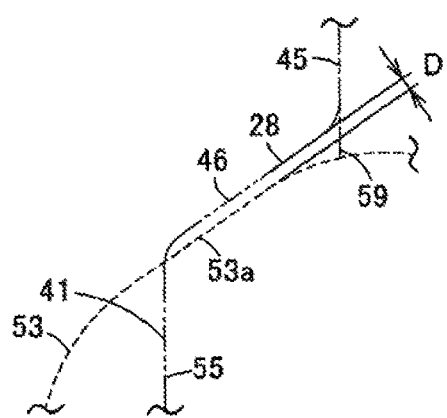
FIG. 4 is a partly-enlarged front view of the cover shown in FIG. 1.

The covering material 22 shown in FIG. 3A and FIG. 3B covers the surface of the surface plate 25 (FIG. 2) to improve external appearance and texture. The covering material 22 is made of, for example, leather, artificial leather, or a sheet-like soft polymer material. The covering material 22 is formed into a substantially circular shape, and covers the tear line 28 shown in FIG. 2, namely, the side tear lines 41, the lateral connection tear line 42, the lower connection tear line 43, the bottom tear line 44, the extension tear lines 45, and the vertical connection tear lines 46. As illustrated in FIG. 3A, the covering material 22 is provided, in the middle thereof, with a through hole 51 communicating with the hole 35 (FIG. 2) to which the emblem 27 (FIG. 1) is attached. The covering material 22 is further provided with a fragile portion 52 (FIG. 3B) on the back surface opposed to the cover body 21, and a stitched portion 53 (FIG. 3A) on the front side.

The fragile portion 52 shown in FIG. 3B is a recess reduced in thickness on the back surface of the covering material 22, and is more fragile than the other regions in the covering material 22 and tearable and deformable. The fragile portion 52 overlaps with the side tear lines 41, the lateral connection tear line 42, the lower connection tear line 43, the bottom tear line 44, and the extension tear lines 45 of the tear line 28 shown in FIG. 2. The fragile portion 52 includes: side fragile portions 55, 55 (a first edge fragile portions) formed on both right and left sides and corresponding to the side tear lines 41; a lateral connection fragile portion 56 (a first connection fragile portion) extending in the right-left direction and corresponding to the lateral connection tear line 42; a lower connection fragile portion 57 (a second connection fragile portion) extending in the vertical direction and corresponding to the lower connection tear line 43; a bottom fragile portion 58 (a second edge fragile portion) extending in the right-left direction and corresponding to the bottom tear line 44; and extension fragile portions 59, 59 extending in parallel and corresponding to the extension tear lines 45. The lateral connection fragile portion 56 and the lower connection fragile portion 57 are located closer to the center of the covering material 22 than the side fragile portions 55 and the bottom fragile portion 58, and opposed to the airbag housed underneath.

The side fragile portions 55 are formed into substantially the same shape as the side tear lines 41, namely, a substantially arc-like shape protruding outward on both sides of the covering material 22.

The lateral connection fragile portion 56 has substantially the same shape as the lateral connection tear line 42. The lateral connection fragile portion 56 includes straight portions 56a, 56a extending straight toward the center from the both side fragile portions 55, and a bypass portion 56b connecting the straight portions 56a and curved downward so as to bypass the emblem 27. The straight portions 56a extend in the right-left direction vertical to the side fragile portions 55 and reach the middle of the respective side fragile portions 55 in the vertical direction. Thus, the fragile portion 52 includes corners (substantially at right angles) at intersecting portions of the side fragile portions 55 and the lateral connection fragile portion 56.

The lower connection fragile portion 57 has substantially the same shape as the lower connection tear line 43, and vertically extends downward from the bypass portion 56b of the lateral connection fragile portion 56. The lower connection fragile portion 57 extends further below the lower ends of the side fragile portions 55, and reaches the bottom fragile portion 58. The lower connection fragile portion 57 connects the lateral connection fragile portion 56 and the bottom fragile portion 58. The lower connection fragile portion 57 therefore connects the respective side fragile portions 55 and the bottom fragile portion 58 via the lateral connection fragile portion 56. The fragile portion 52 includes corners (substantially at right angles) at a intersecting portion of the lower connection fragile portion 57 and the bottom fragile portion 58.

The bottom fragile portion 58 is formed into substantially the same shape as the bottom tear line 44, namely, a substantially arc-like shape protruding downward in the covering material 22.

The extension fragile portions 59 have substantially the same shape as the extension tear lines 45, and extend in parallel in the vertical direction in the covering material 22. The extension fragile portions 59 are located above the stitched portion 53, and separated upward from the side fragile portions 55. The extension fragile portions 59 and the side fragile portions 55 are arranged in the vertical direction with the stitched portion 53 interposed therebetween.

The stitched portion 53 may also be referred to as a decorative stitch, and is formed into a ring-like shape. The stitched portion 53 surrounds the circumference of the side tear lines 41, the lateral connection tear line 42, the lower connection tear line 43, and the bottom tear line 44 of the tear line 28 shown in FIG. 2. Namely, the stitched portion 53 is located along and inside of the outer edge of the front plate 31 of the surface plate 35 in the cover body 21. The stitched portion 53 includes a number of pinholes penetrating the covering material 22 in the thickness direction to serve as a fragile portion, and a thread continuously passing through the pinholes. Part of the stitched portion 53 (on the upper right and left sides) overlaps with sections between the side tear lines 41 and the extension tear lines 45, namely intersects with the tear line 28, so as to connect the side fragile portions 55 and the extension fragile portions 59. In particular, the stitched portion 53 includes fragile portion-connection portions 53a, 53a located at a predetermined distance, for example, distance D (FIG. 4) of 5 mm or less from the vertical connection tear lines 46 of the tear line 28, as viewed from the front in the deployment direction of the airbag. In the present embodiment, the fragile portion-connection portions 53a substantially overlap with the vertical connection tear lines 46.

The respective pinholes are perforations provided by a needle of a stitching machine such as an industrial sewing machine (not shown), and separated at regular intervals in the circumferential direction of the covering material 22. The pinholes are aligned along a predetermined outline.

The thread passes through the continuous pinholes and is exposed on the front side, so as to increase the external appearance of the covering material 22.

The fragile portion-connection portions 53a correspond to part of the outline of the perforations.

The cover 20 is manufactured such that the cover body 21 including the surface plate 25 and the peripheral plate 26 is preliminarily molded by injection molding with synthetic polymer. The covering material 22 is preliminarily provided with the fragile portion 52 and the stitched portion 53. In particular, the back surface of the covering material 22 is provided with the fragile portion 52 reduced in thickness and the stitched portion 53 stitched by the stitching machine. The stitched portion 53 passes through the sections between the side fragile portions 55 and the extension fragile portions 59 separated from each other, so as to prevent the fragile portion 52 from tearing during stitching of the stitched portion 53. The covering material 22 may be integrated with the cover body 21 by insert molding, or may be attached to the preliminarily-molded cover body 21 in the following process. The emblem 27 separately formed is attached to the cover 20 with the surface plate 25 covered with the covering material 22.

Once the vehicle equipped with the airbag device 12 including the cover 20 in the steering wheel 10 causes a collision, a controller activates the inflator to supply gas to the airbag. The airbag is then inflated immediately, and the pressure of inflation of the airbag pushes the respective open-expected flaps 37 up and acts on the tear line 28 and the fragile portion 52. The surface plate 25 of the cover 20 thus splits together with the covering material 22 along the tear line 28 and the fragile portion 52, so as to open the flaps.

The tear line 28 and the fragile portion 52 split from the center toward the circumference. More particularly, the tear line 28 splits from the bypass portion 42b to the straight portions 42a along the lateral connection tear line 42 in the right-left direction, and simultaneously splits downward from the intersecting portion of the bypass portion 42b of the lateral connection tear line 42 and the lower connection tear line 43. Similarly, the fragile portion 53 splits from the bypass portion 56b to the straight portions 56a along the lateral connection fragile portion 56 in the right-left direction, and simultaneously splits downward from the intersecting portion of the bypass portion 56b of the lateral connection fragile portion 56 and the lower connection fragile portion 57.

The tear line 28 then splits from the ends of the straight portions 42a along the side tear lines 41 in the vertical direction and toward the extension tear lines 45 via the vertical connection tear lines 46, and simultaneously splits from the lower end of the lower connection tear line 43 along the bottom tear line 44 in the right-left direction. In association with the splits from the side tear lines 41 to the extension tear lines 45 via the vertical connection tear lines 46 in the tear line 28, the fragile portion 52 splits from the ends of the straight portions 56a along the side fragile portions 55 in the vertical direction. Since the upper ends of the side fragile portions 55 intersect with the fragile portion-connection portions 53a of the stitched portion 53, the covering material 22 keeps splitting along the fragile portion-connection portions 53a. Further, since the upper ends of the fragile portion-connection portions 53a intersect with the extension fragile portions 59, the extension fragile portions 59 of the fragile portion 52 split continuously after the splits of the fragile portion-connection portions 53a of the stitched portion 53. In association with the splits from the lower connection tear line 43 to the bottom tear line 44 in the tear line 28, the fragile portion 52 splits from the lower end of the lower connection fragile portion 57 along the bottom fragile portion 58 in the right-left direction.

As a result, the flaps open and pivot on the hinges 47, 48, and 49 to provide an opening as a deployment space for deploying the airbag, and the airbag is inflated forward from the opening so as to protect the driver.

According to the present embodiment, since the fragile portion 52 is provided on the back surface of the covering material 22 covering the surface plate 25 of the cover body 21, and part of the stitched portion 53 (the fragile portion-connection portions 53a) overlaps with the tear line 28 (the vertical connection tear lines 46) and intersects with (the ends of) the fragile portion 52, the covering surface 22 can be prevented from tearing in the fragile portion 52 during stitching of the stitched portion 53, so as to increase the productivity while improving the external appearance with the stitched portion 53 as a decorative stitch.

In the present embodiment, the side fragile portions 55 and the extension fragile portions 59 are separated from each other on the back surface of the covering material 22 and overlap with part of the tear line 28 of the cover body 21, and part of the stitched portion 53 (the fragile portion-connection portions 53a) connects the side fragile portions 55 and the extension fragile portions 59 (the respective ends of the side fragile portions 55 and the extension fragile portions 59) along part of the tear line 28 (the vertical connection tear lines 46). Accordingly, the covering material 22 can split in a predetermined shape as designed from the side fragile portions 55 to the extension fragile portions 59 through at least part of the stitched portion 53 (the fragile portion-connection portions 53a) at the time of deployment of the airbag, so as to achieve appropriate splitting performance along the side fragile portions 55, the fragile portion-connection portions 53a, and the extension fragile portions 59.

More particularly, the fragile portion 52 on the covering material 22 includes the side fragile portions 55 corresponding to the side tear lines 41 of the cover body 21, the lateral connection fragile portion 56 corresponding to the lateral connection tear line 42 of the cover body 21, and the extension fragile portions 59 corresponding to the extension tear lines 45 of the cover body 21. The fragile portion-connection portions 53a partly provided in the stitched portion 53 connect the connecting side fragile portions 55 and the extension fragile portions 59 while overlapping with the sections between the side tear lines 41 and the extension tear lines 45, and are located at a predetermined distance or less from the vertical connection tear lines 46, as viewed in the deployment direction of the airbag. Accordingly, the covering material 22 splits sequentially along the lateral connection fragile portion 56, the connecting side fragile portions 55, the fragile portion-connection portions 53a, and the extension fragile portions 59, in association with the splits of the cover body 21 along the lateral connection tear line 42, the side tear lines 41, the vertical connection tear lines 46, and the extension tear lines 45 at the time of deployment of the airbag, so that the cover 20 splits in a predetermined shape accurately.

The covering material 22 includes the fragile portion 52 (particularly, the lateral connection fragile portion 56, the lower connection fragile portion 57, the intersecting portion of the lateral connection fragile portion 56 and the side fragile portions 55, and the intersecting portion of the lower connection fragile portion 57 and the bottom fragile portion 58) at the starting points of splitting of the tear line 28, that is, at the lateral connection tear line 42 and the lower connection tear line 43 to which the inflation pressure of the airbag is directly applied, and at the points where the tear line 28 is branched, that is, at the intersecting portions of the side tear lines 41 and the lateral connection tear line 42 and the intersecting portion of the lower connection tear line 43 and the bottom tear line 44. Therefore, the covering material 22 can split in a predetermined shape as designed. Further, the sections corresponding to the vertical connection tear lines 46 and only provided with the stitched portion 53 are tearable by inertial force, so that the sections can split along the stitched portion 53.

The fragile portion-connection portions 53a of the stitched portion 53 are located at a distance of 5 mm or less from the tear line 28 (the vertical connection tear lines 46) as viewed in the deployment direction of the airbag, so that the covering material 22 can split from the side fragile portions 55 to the extension fragile portions 59 through the fragile portion-connection portions 53a more accurately in association with the split of the tear line 28 of the cover body 21.

In a case in which a stitched portion is formed closely to a fragile portion on a covering material, the covering material may be ruptured during stitching, or even if not, the covering material may split irregularly such that a section in which the fragile portion splits and a section in which the stitched portion splits coexist, at the time of deployment of the airbag. According to the present embodiment, the fragile portion 52 is not provided along the tear line 28 at the positions where the stitched portion 53 come closer, so that the fragile portion 52 is separated from the stitched portion 53. Further, the combination of the fragile portion 52 and the stitched portion 53 is designed to conform to the tear line 28, so as to prevent the covering material 22 from tearing in the fragile portion 52 during stitching of the stitched portion 53, and also prevent the covering material 22 from splitting irregularly in both the fragile portion 52 and the stitched portion 53. Since the present embodiment is not required to purposely design the stitched portion 53 so as not to overlap with the tear line 28 or define the tear line 28 so as not to overlap with the stitched portion 53, the present embodiment can expand the possibility of location and design of the stitched portion 53.

Further, the covering material 22 includes the sections not provided with the fragile portion 52 reduced in thickness between the side fragile portions 55 and the extension fragile portions 59, so as to shorten the processing time and increase the productivity.

The fragile portion 52 and the stitched portion 53 are not limited to the configurations described in the embodiment above, as long as the fragile portion 52 at least partly overlaps with the tear line 28 and is connected to part of the stitched portion 53. The stitched portion 53 may have a configuration of simply connecting both ends of the fragile portion 52, instead of the configuration of connecting separate parts of the fragile portion 52 together. In the case of simple connection, the fragile portion 52 is formed into substantially the same shape as the tear line 28, so that the stitched portion 53 serves as a stop end for the tear line 28 and the fragile portion 52. Accordingly, the cover body 21 and the covering material 22 can split in a predetermined shape along the tear line 28 and the fragile portion 52, while the part of the stitched portion 53 on the covering material 22 not provided with the fragile portion 52 serves as a stop end, so as to prevent excessive rupture on the cover body 21 and the covering material 22.

The cover 20 may include not only the single covering material 22 but also a plurality of covering materials. In such a case, the stitched portion 53 may be used for stitching the plural covering materials together.

The cover 20 may be applicable not only to the driver-side airbag device but also to various airbag devices. For example, the cover 20 may be applicable to a passenger-side airbag device installed in an instrument panel for deploying an airbag toward a front passenger, or to a knee airbag device for deploying an airbag between a vertical wall surface opposed to a front passenger and the space for the legs of the front passenger.

What is claimed is:

1. A cover for an airbag device comprising:
   a cover body including an opposed part covering an airbag housed underneath, and a tear line provided on the cover body and splitting when the airbag is inflated; and
   a covering material covering the opposed part of the cover body,
   the covering material including:
      a fragile portion provided on a back surface of the covering material and partly overlapping along with the tear line; and
      a stitched portion, at least part of the stitched portion being located along with the tear line and connected to the fragile portion,
   wherein
   the fragile portion includes a plurality of fragile portions independently provided on the back surface of the covering material;
   each of the fragile portions includes an end; and
   the stitched portion connects the ends of the fragile portions to each other.

2. The cover for an airbag device according to claim 1, wherein:
   the tear line includes
      side tear lines extending on both sides of the opposed part,
      a lateral connection tear line connecting the side tear lines,
      extension tear lines located separately from ends of the side tear lines, and
      vertical connection tear lines connecting the side tear lines and the extension tear lines;
   the fragile portion includes
      side fragile portions corresponding to the side tear lines,
      a lateral connection fragile portion corresponding to the lateral connection tear line, and
      extension fragile portions corresponding to the extension tear lines;
   the stitched portion includes
      a fragile portion-connection portion; and
   the fragile portion-connection portion connects the end of the side fragile portion and the end of the extension fragile portion so as to extend between a position connecting with the end of the side fragile portion and a position connecting with the end of the extension fragile portion, and is located at a predetermined distance or less from the vertical connection tear line as viewed in a deployment direction of the airbag.

3. The cover for an airbag device according to claim 1, wherein a part of the stitched portion connected to the end of the fragile portion is located at a distance of 5 mm or less from the tear line as viewed in a deployment direction of the airbag.

* * * * *